Feb. 3, 1970    R. W. CRIBB    3,493,719
ARC-WELDING ELECTRODE HOLDER
Filed May 14, 1968    2 Sheets-Sheet 1
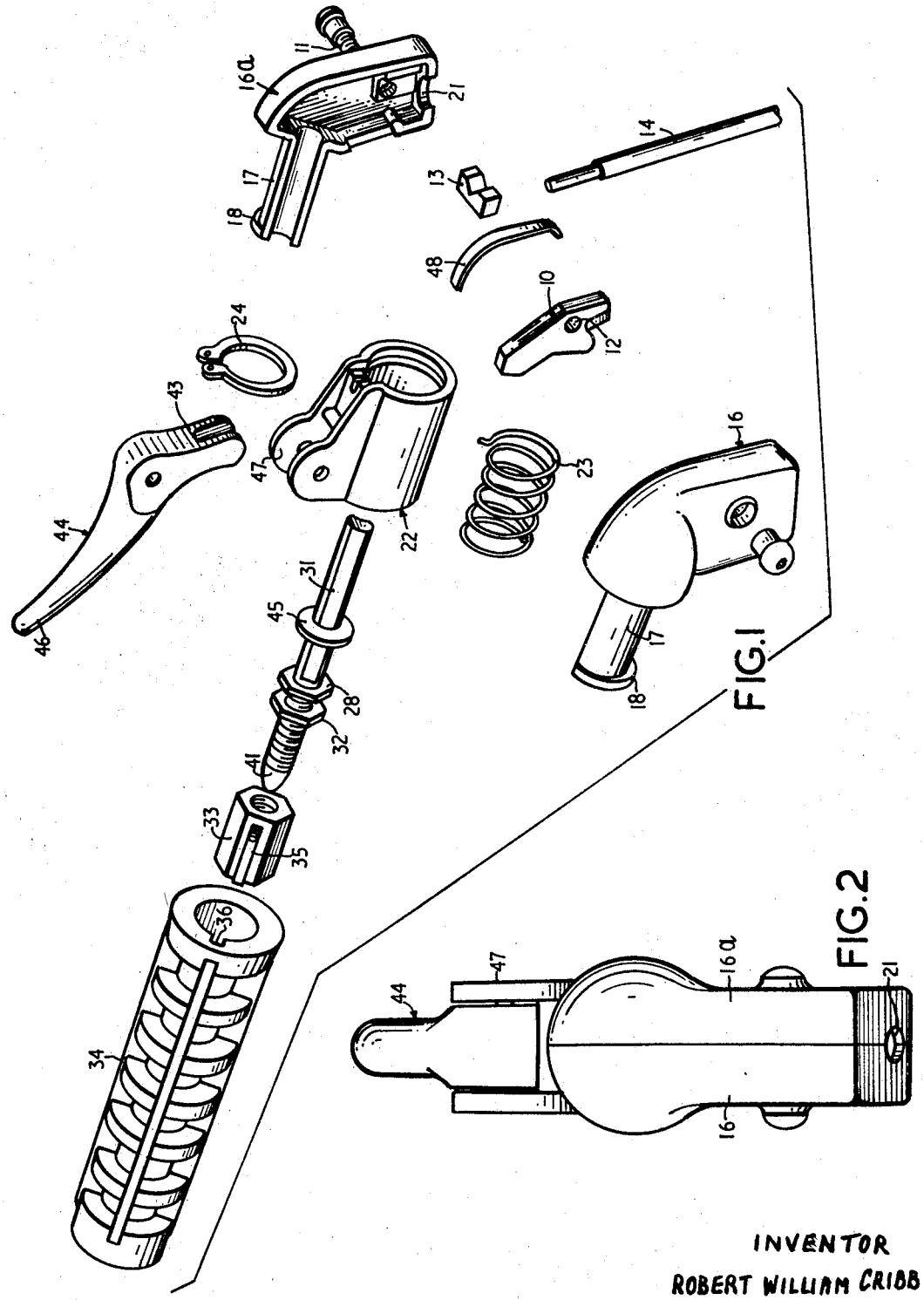
INVENTOR
ROBERT WILLIAM CRIBB

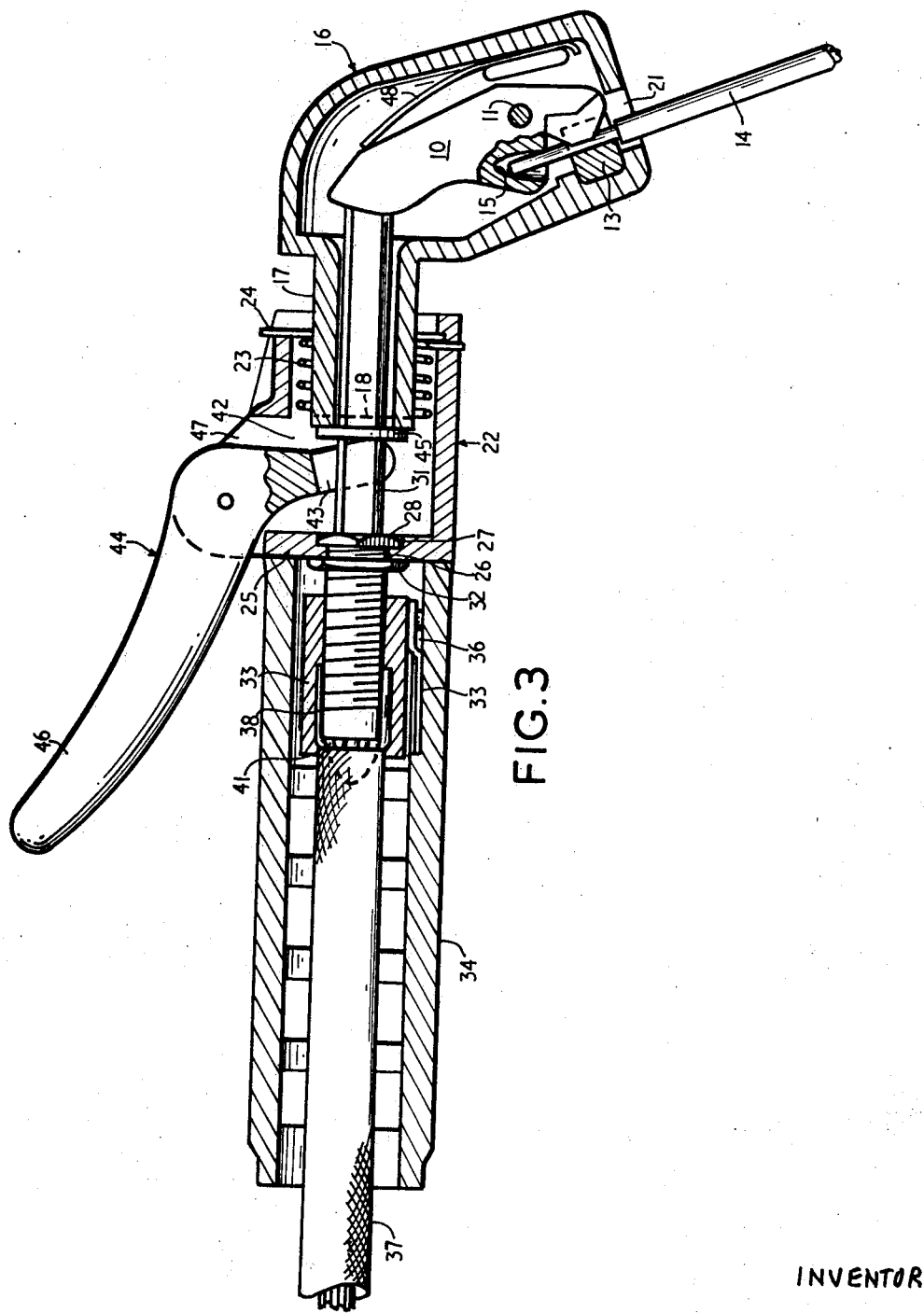

United States Patent Office 3,493,719
Patented Feb. 3, 1970

3,493,719
ARC-WELDING ELECTRODE HOLDER
Robert William Cribb, 23 Hull Road, Beecroft,
New South Wales, Australia
Filed May 14, 1968, Ser. No. 729,041
Claims priority, application Australia, May 16, 1967,
21,781/67
Int. Cl. B23k 9/28
U.S. Cl. 219—142                                 4 Claims

ABSTRACT OF THE DISCLOSURE

An arc-welding electrode holder in which a fixed and a pivotably movable jaw are contained within an electrically insulating casing connected to an insulating handle by which the holder may be held in the hand, the casing being movable relative to the handle, by means of a hand lever projecting from the handle, against the action of a coil spring which acts to move the casing towards the handle thereby forcing the moveable jaw into contact with a fixed electrically conducting member projecting from the handle into the casing and thus causing the movable jaw to grip an electrode inserted through a hole in the casing so that one end of it lies between the jaws. The handle is hollow so that a current carrying cable may pass through it for connection to one end of the fixed electrically conducting member.

---

The present invention relates to an arc-welding electrode holder and has for its object the provision of an arc-welding holder having certain advantages over constructions at present in use.

In arc-welding it is necessary to provide a holder for the welding electrode so that on the one hand current may be supplied to the electrode to enable welding to be carried out and so that on the other hand the operator may have a convenient means of holding and manipulating the electrode in such a manner that he is protected from the heat generated during the welding process. An important feature of an electrode holder is that the insertion of a new electrode and the removal of the used electrode may be accomplished very quickly. This is of economic importance as a welder may use some hundreds of welding rods during the day so that any loss of time in exchanging rods can result in a considerable loss of time considered over a day or week.

Electrode holders at present in use rely either on a leaf spring to cause a pair of jaws to clamp about the end of an electrode or alternatively on a screw operated mechanism for clamping the jaws. The former construction is satisfactory except that the spring is exposed to a considerable amount of heat from the welding operation which leads to fairly rapid deterioration of the spring necessitating its replacement. The latter form of construction avoids difficulties of this sort but is only partially satisfactory owing to the amount of time required for its operation.

A further difficulty that can arise with welding electrode holders is due to the fact that if metal parts in electrical connection with the welding circuit are exposed on the surface of the electrode holder this can result in arcing if the holder is laid down on a metal object in contact with earth.

The invention consists in an arc welding electrode holder having an electrically insulating casing contained within which are an upper jaw member pivotably mounted in relation to the casing and a lower jaw member fixed in relation to the casing, the jaws being arranged near an aperture in the casing through which a welding electrode may be inserted to be gripped between said jaw members, an electrically insulating handle by means of which the electrode holder may be held in the hand, said handle being substantially cylindrical in form and having an axial bore through which an electrical conductor for supplying current to an electrode in said holder may pass, there being an axially aligned extension of said handle into which a portion of the casing extends, a substantially annular space being defined between the handle extension and the said portion of the casing, a coil spring in said space, the coil spring acting between an abutment on the handle extension and an abutment on said portion of the casing to urge the portion of the casing into the handle extension, lever means pivotably attached to said handle, a first portion of said lever means projecting externally of the handle and being movable by the hand of a user holding said handle, and a second portion of said lever means being in operative contact with said portion of the casing, the arrangement being such that pivotal movement of said first portion of the lever means in a direction towards the handle causes axial movement of said portion of the casing away from the handle against the action of the coil spring, a rigid electrically conducting member extending from the handle into the said portion of the casing, the said conducting member being fixed in relation to the handle and having means within the handle to which the said conductor may be attached, the end of the conducting member in the casing being positioned in relation to the upper jaw member in such a manner that the action of the coil spring on the casing causes one end of the upper jaw member to be forced against the end of said conducting member within the casing, thereby causing the other end of the upper jaw member to be brought into gripping contact with an electrode inserted between said jaws, pivotal movement of said first portion of the lever means towards the handle acting to relieve the pressure on the upper jaw member thereby permitting the electrode to be removed from the jaws.

In order that the invention may be better understood and put into practice a preferred form thereof is hereinafter described by way of example with reference to the accompanying drawings in which:

FIG. 1 is an exploded perspective view of the welding electrode holder showing the individual parts separated,
FIG. 2 is an end elevation thereof, and
FIG. 3 is a sectional elevation on a medium plane of the assembled electrode holder.

In the preferred form of the invention the means to grip the end of a welding rod consist of an upper jaw member 10 which is made of metal such as copper and which is of elongated shape being pivoted about a transverse horizontal axle 11 passing through a hole 12 near the middle of the jaw 10. The jaw 10 may be reinforced with a steel insert if desired. The lower jaw member consists of a more or less V-shaped piece of metal 13, preferably steel, in which the upper jaw member 10 lies between the sides of the V. The welding electrode 14 is clamped between the under side of the upper jaw member 10 and the adjacent surface of the lower jaw member 13. The upper jaw member 10 is provided with a hole 15 extending rearwardly of the axle 11 and which is adapted to receive the end of the welding electrode 14 after it has been inserted between the jaws. The purpose of this is to enable the electrode to be bent to any shape that the operator desires after it has been inserted in the holder. This point is made clearer below.

The jaw members are encased in a two part casing 16 and 16a made preferably of a moulded fiber glass filled phenolic resin which is capable of resisting the heat produced during welding operations. The casing consists of a cylindrical portion 17 having an external flange 18 at its lower end and a jaw enclosing portion which extends at an angle from one end of the cylindrical portion 17 in such a manner that the complete casing has the appearance of a small piston. The two parts 16 and 16a of the casing meet in a plane passing through the axis of the cylindrical portion 17 and when the holder is assembled are held together by means of a screw which also constitutes the axle 11 for the upper jaw member. The ends of this screw are covered by insulating material in any suitable manner to ensure that all metal parts of the holder are fully enclosed. A hole 21 is provided in the end of the casing adjacent the jaws through which a welding electrode may be inserted.

The casing 16, 16a may be arranged so that it points in the direction shown in FIG. 3 or it may be turned through 180° during assembly of the electrode holder so that it faces the other way according to the user's preference.

The cylindrical portion 17 of the casing is contained within an outer cylinder 22 made of similar insulating material and constituting an axial extension of the handle 34 described below, and in the space between the cylindrical portion 17 and the outer cylinder 22 a coil spring 23 is contained which acts between the flange 18 on the cylindrical portion and a circlip or locking ring 24 carried in the upper end of the inner face of the outer cylinder 22. The action of this coil spring 23 is to press the flange 18 of the casing downwardly into the outer cylinder 22.

The end of the outer cylinder 22 opposite the casing is closed by a plate 25 which is formed integrally with the outer cylinder 22 and in the centre of which is a hole 26 having a hexagonal counter bore 27 which accommodates a closely fitting hexagonal boss 28 formed on a brass rod 31 which extends into the interior of the casing and makes contact with the rear end of the upper jaw member 10. This brass rod 31 passes through the end plate 25 of the outer cylinder 22 and is held in place by an external nut 32 which is threaded onto the end of the brass rod 31.

Also threaded onto the end of the rod 31 is a brass socket 33 which fits frictionally into the end of the handle 34 made of the same material as the casing 16, 16a, and is prevented from rotating in it by engagement between the spring steel strip 35 and the channel 36 in the bore of the handle 34. An insulated conductor 37 is attached to the electrode holder by its bared end 38, being clamped between the interior of the sleeve 33 and the pointed end 41 of the rod 31 as shown in FIG. 3.

A hole 42 is formed in the wall of the outer cylinder 22 near its closed end and through this hole projects the shorter arm 43 of a bell crank lever 44 so that its inner bifurcated end lies beneath and in contact with a washer 45 freely slidable on rod 31, the other arm 46 projects outwardly making an angle of approximately 30° with the axis of the outer cylinder 22. The bell crank lever 44 which constitutes an operating lever for the electrode holder is pivoted to a lug 47 formed integrally with the outer cylinder 22.

In use an electrode 14 is inserted in the electrode holder by the operator pressing the longer arm 46 of the bell crank lever 44 towards the handle 34 of the electrode holder which has the effect of causing the shorter arm 43 of the bell crank lever to force the cylindrical portion 17 of the casing 16, 16a upwardly against the coil spring 23 as shown in FIG. 3. This action has the effect of raising the pivot of the upper jaw 10 in relation to the brass rod. It does not actually leave the rod owing to the action of the light stainless steel spring 48. The shape and weight distribution of the upper jaw 10 in relation to the axle 11 are chosen so that as the casing is raised the rear end of the upper jaw falls aided by spring 48 thus opening the jaws to allow a welding electrode 14 to be inserted between them. As soon as the operating lever 44 is released the coil spring 23 acts to force the portion 17 downwardly thus pushing the rear end of the upper jaw 10 against the upper end of the brass rod 31 and clamping the electrode 14 between the jaws 10 and 13.

The construction described enables a welding electrode to be inserted or removed extremely quickly and the construction has two important features the first of which is that the operating spring lying as it does between two layers of insulating material is well insulated from heat transmitted to the jaws and the brass rod from the welding electrode and secondly the metal parts of the electrode holder are completely enclosed thus preventing any danger of arcing when the holder is laid down on a metal surface.

The provision of the hole in the upper jaw extending beyond the pivot point ensures that when the electrode is bent the bending force cannot act to open the jaws against the force of the coil spring.

The embodiment of the invention described above is given by way of example only as being one construction incorporating the main features of the invention which give the two advantages referred to above. A variety of other constructions within the scope of the succeeding claims will be readily devisable by those skilled in the art.

I claim:

1. An arc welding electrode holder having an electrically insulating casing contained within which are an upper jaw member pivotably mounted in relation to the casing and a lower jaw member fixed in relation to the casing, the jaws being arranged near an aperture in the casing through which a welding electrode may be inserted to be gripped between said jaw members, an electrically insulating handle by means of which the electrode holder may be held in the hand, said handle being substantially cylindrical in form and having an axial bore through which an electrical conductor for supplying current to an electrode in said holder may pass, there being an axially aligned extension of said handle into which a portion of the casing extends, a substantially annular space being defined between the handle extension and the said portion of the casing, a coil spring in said space, the coil spring acting between an abutment on the handle extension and an abutment on said portion of the casing to urge the portion of the casing into the handle extension, lever means pivotally attached to said handle, a first portion of said lever means projecting externally of the handle and being movable by the hand of a user holding said handle, and a second portion of said lever means being in operative contact with said portion of the casing, the arrangement being such that pivotal movement of said first portion of the lever means in a direction towards the handle causes axial movement of said portion of the casing away from the handle against the action of the coil spring, a rigid electrically conducting member extending from the handle into the said portion of the casing, the said conducting member being fixed in relation to the handle and having means within the handle to which the said conductor may be attached, the end of the conducting member in the casing being positioned in relation to the upper jaw member in such a manner that the action of the coil spring on the casing causes one end of the upper jaw member to be forced against the end of said conducting member within the casing, thereby causing the other end of the upper jaw member to be brought into gripping contact with an electrode inserted between said jaws, pivotal movement of said first portion of the lever means towards the handle acting to relieve the pressure on the upper jaw member thereby permitting the electrode to be removed from the jaws.

2. An arc welding electrode holder as claimed in claim 1, wherein all electrically conducting portions are wholly contained within electrically insulating portions whereby accidental electrical contact with earthed objects is prevented.

3. An arc welding electrode holder as claimed in claim 1 wherein the casing, the handle extension and the lever means are made from fibreglass filled phenolic resin by moulding.

4. An arc welding electrode holder as claimed in claim 1 wherein the upper jaw member is provided with a hole into which the end of an electrode may be inserted when the electrode is in position between the jaw members.

References Cited

UNITED STATES PATENTS

| | | | |
|---|---|---|---|
| 2,283,996 | 5/1942 | Irwin et al. | 219—142 |
| 2,447,307 | 8/1948 | Baker et al. | 219—143 |
| 2,873,357 | 2/1959 | Landis | 219—138 |

JOSEPH V. TRUHE, Primary Examiner

L. A. ROUSE, Assistant Examiner

U.S. Cl. X.R.

219—143